Feb. 7, 1967   R. R. BLACKBURN   3,303,317
SPOT WELDING GUN
Filed April 7, 1966
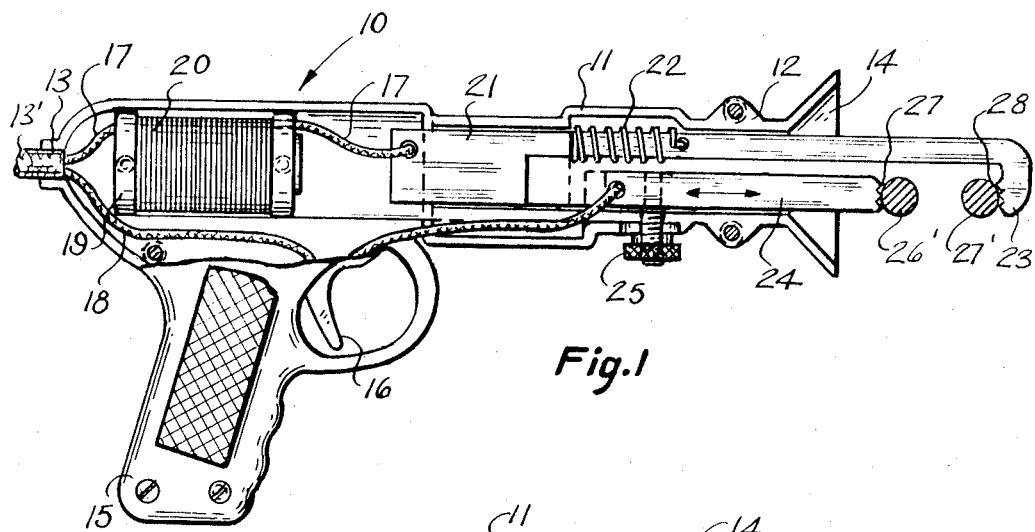
Fig.1
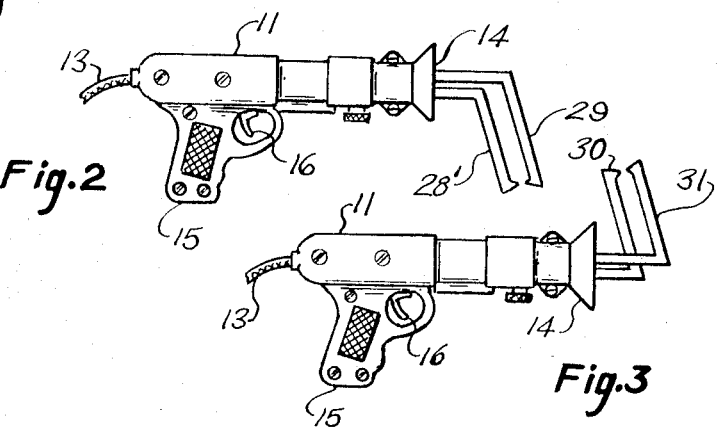
Fig.2
Fig.3
INVENTOR.
*Robert R. Blackburn*

3,303,317
SPOT WELDING GUN
Robert R. Blackburn, Olmstedville, N.Y. 12857
Filed Apr. 7, 1966, Ser. No. 540,871
5 Claims. (Cl. 219—90)

This invention relates to welding and soldering devices, and more particularly a spot welding gun.

It is therefore the main purpose of this invention to provide a spot welding gun for welding reinforcement rods to each other which requires a minimum of maintenance and provides a maximum of serviceability.

Another object of this invention is to provide a spot welding gun wherein additional tip portions may be used for other work than welding reinforcement rods together.

Another object of this invention is to provide a spot welding gun wherein an adjustable rod is provided for varying the distance between the jaws.

Still another object of this invention is to provide a spot welding gun which is of rugged construction, inexpensive to manufacture, and provides maximum utility to its user.

Other objects and advantages of this invention will become apparent from a consideration of the following detailed description taken in connection with the accompanying drawing, wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a face view of the mechanism of this invention, portions of which are shown broken away.

FIGURE 2 and FIGURE 3 relate to a modified form of this invention.

According to this invention, a spot welding gun 10 is provided with a gun-like facing 11, one portion of which includes an elongated, barrel-like member 12 for housing the operative elements of this invention. One end of member 12 is provided with an opening 13 adapted to admit a conventional, electrical conductor wire shield 13' which carries a current wire 17 and a ground wire 18. The remaining portions of the casing 11 include a handle 15 and a two-stage trigger 16. A conventional magnetic core 19 is suitably positioned within one end portion of the member 12, core 19 is suitably wound with a conductor wire coil 20 for exercising electro-magnetic flux on said core 19. One end of the conductor wire 17 is suitably secured with coil 20 and the other end of wire 17 is positioned between said coil and piston rod 21 for supplying electrical current potential to said rod 21. A return spring is suitably positioned on rod 21 for returning said rod into its inoperative position after completion of the welding operation. The front end of member 12 is provided with a conically expanding flash shield 14 adapted to prevent sparks from leaving the work area during a welding operation. The perpendicularly extending outward end 23 of the piston rod 21 is provided with jaw 28.

Looking now at FIGURE 1 of the drawing, one will see that ground wire 18 is operably connected with trigger 16 and is further extended into an adjustable elongated rod 24. The end portion of said rod is provided with jaw 27 which in contact with jaw 28, or any other metallic material therebetween, causes an increased surge of electric power thus completing the electric circuit of the welding gun 10. For sake of better performance, elongated rod 24 may be suitably adjusted for increasing or decreasing of the electrical surge on the metallic rods 26', 27' located therebetween. The manually adjustable screw 25 serves another purpose, namely, permits removal of rod 24 during maintenance activities.

In operation, a pair of reinforcement rods 26' and 27' are positioned between the jaws 27 and 28 of the respective elements 24 and 21. After pulling of the trigger 16, in a halfway position, an electrical circuit is activated by the magnetic core 19 and the wire 20 thereby closing jaws 27 and 28 and/or reinforced rods 26' and 27' together. After the welding operation is performed, trigger 16 is pulled once more for opening the circuit and thereby releasing the magnetic force of the core 19. This causes the piston rod to return to its original position. The actual movement of piston rod 21 is initiated by the return spring 22 which, after release of electro-magnetic forces returns to its original state thereby returning rod 21 to its original position.

It will also be noted that in its modified form the invention provides for removable, angularly disposed rods 28' and 29 or 30 and 31 thus enabling the welder to spotweld metallic material, such as, plates, angular sheets, etc.

What I now claim is:

1. A spot welding gun comprising, in combination, a gun casing including a hollow, elongated member, a handle and a trigger member, one end of said member provided with an opening therein, a current and a ground wire admitted into said casing therethrough, a magnetic core secured within said member, a magnetic coil wound around said core and being secured between the inner ends of said current wire, a movable elongated rod secured to said current wire which, in conjunction with said core and said magnetic coil, is capable of longitudinally moving said rod into an inward direction, a return spring affixed between said casing and said rod for retracting said rod to its original position, said ground wire adapted to communicate with said trigger member, an adjustable second rod adapted to electrically communicate with said trigger member by means of said ground wire, so that when said trigger member is depressed the end portion of said movable rod moves toward said second rod thereby closing the electrical circuit within said casing in such a manner that the end portion of said adjustable rod communicates with the end portion of said movable rod by means of reinforcement rods positioned therebetween, and said reinforcement rods become welded to each other by means of the surge of the electric current.

2. The combination according to claim 1, wherein the other end of said hollow, elongated member assumes an outwardly extending conical configuration which acts as a flash shield during a welding operation.

3. The combination according to claim 1, wherein a manually adjustable screw is provided for longitudinally adjusting said second rod within said hollow member.

4. The combination according to claim 1, wherein said trigger member is suitably adapted to perform a two-cycle operation, one of which being to close said electrical circuit, and the other cycle capable of opening up said circuit.

5. The combination according to claim 1, wherein the end portion of said movable rod is provided with a jaw-like, corrugated configuration, and the end portion of said second rod being provided with a substantially similar configuration for providing grasping means to hold reinforcement rods positioned therebetween.

References Cited by the Examiner

UNITED STATES PATENTS 1,310,127  7/1919  Merrill _____ 219—78

FOREIGN PATENTS 394,553  5/1924  Germany.
67,843  10/1925  Sweden.

ANTHONY BARTIS, *Primary Examiner.*

RICHARD M. WOOD, *Examiner.*